(12) United States Patent
Lundberg et al.

(10) Patent No.: US 7,268,834 B2
(45) Date of Patent: Sep. 11, 2007

(54) METHOD AND APPARATUS FOR COMBINING VIDEO SIGNALS TO ONE COMPREHENSIVE VIDEO SIGNAL

(75) Inventors: Stefan Lundberg, Lund (SE); Gunnar Dahlgren, Gothenburg (SE)

(73) Assignee: Axis, AB, Lund (SE)

( * ) Notice: Subject to any disclaimer, the term of this patent is extended or adjusted under 35 U.S.C. 154(b) by 490 days.

(21) Appl. No.: 10/772,928

(22) Filed: Feb. 4, 2004

(65) Prior Publication Data

US 2004/0183949 A1    Sep. 23, 2004

Related U.S. Application Data

(60) Provisional application No. 60/462,041, filed on Apr. 10, 2003.

(30) Foreign Application Priority Data

Feb. 5, 2003    (SE)  ................................ 0300286

(51) Int. Cl.
    *H04N 9/74*    (2006.01)
(52) U.S. Cl. ..................... 348/590; 348/586
(58) Field of Classification Search ............. 348/584, 348/586, 590, 591, 600; 382/173, 190, 194, 382/195; 345/629, 632, 630, 633, 634, 638, 345/641
    See application file for complete search history.

(56) References Cited

U.S. PATENT DOCUMENTS

| | | | | |
|---|---|---|---|---|
| 4,968,132 | A * | 11/1990 | Ferren | 352/46 |
| 5,016,105 | A * | 5/1991 | Muller et al. | 348/585 |
| 5,353,392 | A * | 10/1994 | Luquet et al. | 345/632 |
| 5,566,251 | A * | 10/1996 | Hanna et al. | 382/284 |
| 5,872,556 | A * | 2/1999 | Rackley et al. | 345/603 |
| 5,953,076 | A * | 9/1999 | Astle et al. | 348/584 |
| 5,982,452 | A | 11/1999 | Gregson et al. | |
| 6,020,931 | A * | 2/2000 | Bilbrey et al. | 348/584 |
| 6,072,537 | A | 6/2000 | Gurner et al. | |
| 6,100,925 | A | 8/2000 | Rosser et al. | |
| 6,141,060 | A * | 10/2000 | Honey et al. | 348/578 |
| 6,320,624 | B1 | 11/2001 | Ayer et al. | |
| 6,525,741 | B1 | 2/2003 | Klassen et al. | |
| 6,597,406 | B2 * | 7/2003 | Gloudemans et al. | 348/587 |
| 6,766,054 | B1 * | 7/2004 | Christensen et al. | 382/173 |
| 6,909,438 | B1 * | 6/2005 | White et al. | 345/629 |
| 7,015,977 | B2 * | 3/2006 | Kurashige | 348/584 |
| 7,046,260 | B2 * | 5/2006 | Frimout et al. | 345/660 |

* cited by examiner

*Primary Examiner*—Victor R. Kostak
(74) *Attorney, Agent, or Firm*—IP Creators; Charles C Cary

(57) ABSTRACT

Method and apparatus for combining a first video signal and a second video signal. The method comprising the act of replacing data in the second video signal with corresponding, in respect of a position within an image, data from the first video signal when said data in the second video signal represent a predefined repetitive pattern. The apparatus comprising a first input for input of the first video signal; a second input for input of the second video signal; an output for output of a third video signal; a keying-pattern detector connected to said second input for detecting a predefined repetitive pattern, wherein said keying-pattern detector comprises a means for receiving and/or storing a representation of the predefined repetitive pattern, and an output that is arranged to provide a signal indicating whether said predefined repetitive pattern is detected or not; and a video switch connected to said first input, said second input, said output and said output of the keying-pattern detector for continuously selecting a video signal from one of the first and second input to be represented in a third video signal, said selection being controlled by a signal from the output of the keying-pattern detector.

8 Claims, 6 Drawing Sheets

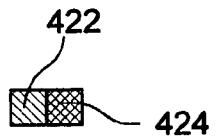
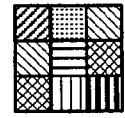
FIG 5a  FIG 5b  FIG 5c  FIG 5d
| Y1 Cb Cr | Y2 | Y1 Cb Cr | Y2 | Y1 Cb Cr | Y2 |
|---|---|---|---|---|---|
| Y1 Cb Cr | Y2 | Y1 Cb Cr | Y2 | Y1 Cb Cr | Y2 |
FIG 6a
| Y1 Cb Cr | Y2 | Y3 | Y4 | Y1 Cb Cr | Y2 |
|---|---|---|---|---|---|
| Y1 Cb Cr | Y2 | Y3 | Y4 | Y1 Cb Cr | Y2 |
FIG 6b
| Y1 Cb Cr | Y2 | Y1 Cb Cr | Y2 | Y1 Cb Cr | Y2 |
|---|---|---|---|---|---|
| Y3 | Y4 | Y3 | Y4 | Y3 | Y4 |
FIG 6c
| Y1=Yα Cb= --- Cr= --- | Y1=Yβ |
|---|---|
FIG 7

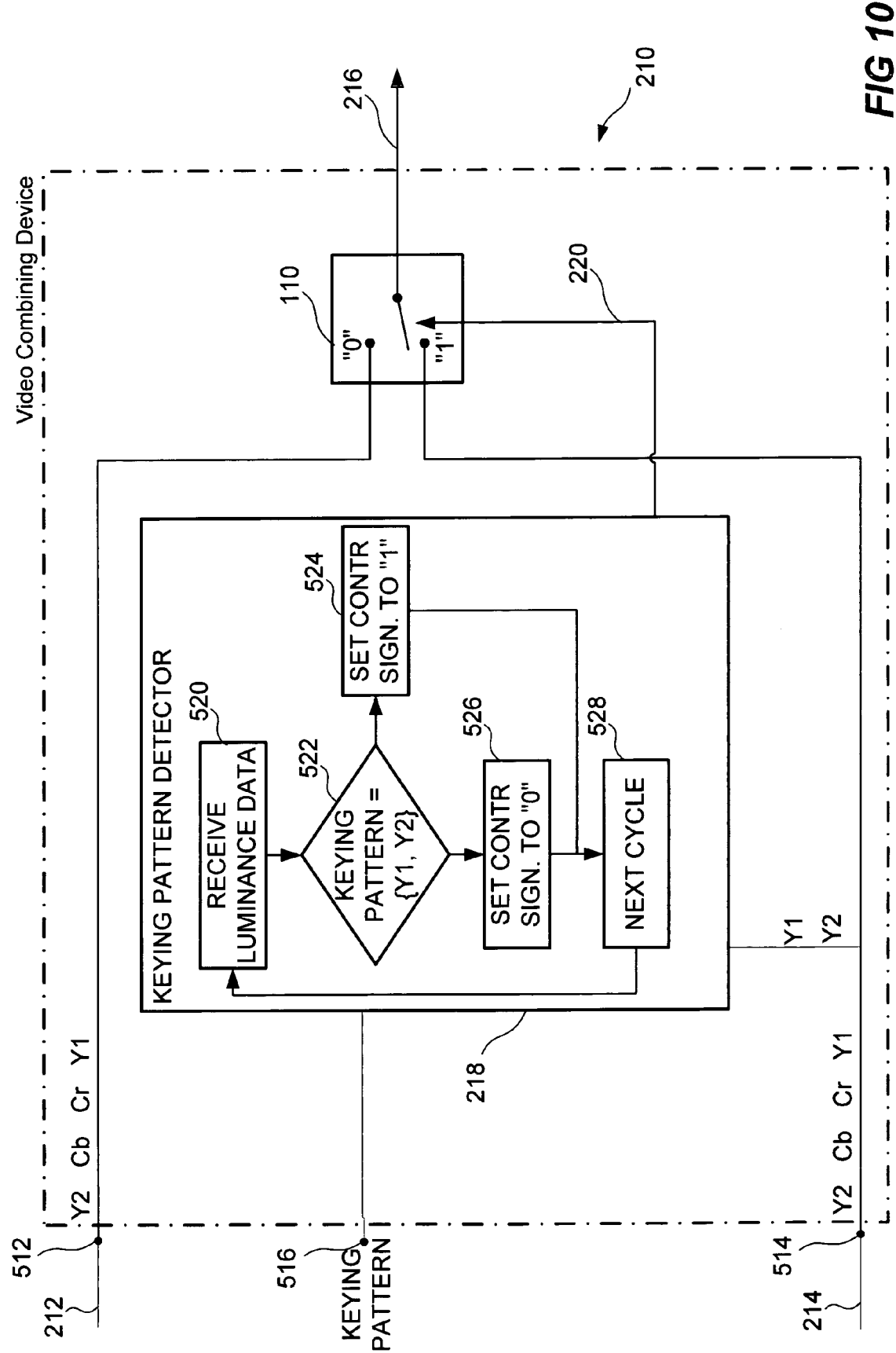

METHOD AND APPARATUS FOR COMBINING VIDEO SIGNALS TO ONE COMPREHENSIVE VIDEO SIGNAL

CROSS REFERENCE TO RELATED APPLICATION

This application claims the benefit of priority to Swedish Application No. 0300286-2, filed on Feb. 5, 2003, entitled "Method and Apparatus for Combining Video Signals to One Comprehensive Video Signal" and prior filed co-pending Provisional Applications No. 60/462,041, filed on Apr. 10, 2003 entitled "Method and Apparatus for Combining Video Signals to One Comprehensive Video Signal" which are incorporated herein by reference in their entirety as if fully set forth herein.

TECHNICAL FIELD OF THE INVENTION

The present invention relates to a method and an apparatus for combining a first video signal with a second video signal, wherein said video signals represent video images and wherein at least the first video signal represents a moving picture. Further, the present invention relates to a video signal, wherein each pixel of a video image of said video signal is represented by a luminance value and chrominance values.

BACKGROUND OF THE INVENTION

Means for combining or merging two or more video signals into one video signal is known in the art. For instance, such technique is normally used in motion pictures or in television recordings for placing a foreground object or person in an environment that is different from the environment of the recording of the object or person.

Normally, such prior art means utilises a technique called colour-keying. In a simple form of colour-keying the foreground object or person is recorded, foreground recording, in front of a screen that is coloured by a single colour, usually blue or green. A second recording of the desired background is also made. Then, by checking the colour of the foreground recording, switching between two video signals representing the two recordings, respectively, may be performed based on the colour information of the foreground recording in order to combine the two recordings. When the colour of the screen in the foreground recording is detected the background video signal is switched into the video signal representing the combined video signal and when the colour of the screen is not detected in the foreground recording, the foreground video signal is switched into the video signal representing the combined video signals.

Colour-keying is a widely spread technique for combining two video signals and it may be used both on recorded and live video.

However, a colour-keying system requires that a specific colour in the foreground video signal is reserved as a replacement signal. Thus, this reserved colour may not be present in any part of the foreground that is not to be replaced by the background recording. This limits the number of allowed colours in the foreground recording and results in that a user has to make arrangements to prevent the reserved colour from turning up in the portions of the recording that should not be replaced.

In U.S. Pat. No. 5,566,251, describing a system for deriving a composite video image by merging video image data from a plurality of separate video signal sources, a technique different from colour-keying is used. In said system an operator designates an arbitrary target pattern, for example a logotype pattern on a billboard, in one video sequence. The system then monitors that video sequence continuously and in every video image of the video sequence that the logotype pattern is found the system replaces the logotype pattern with a video image data from another video signal source.

More specific, the system according to U.S. Pat. No. 5,566,251 searches for the logotype pattern and when found estimates the orientation, scale, perspective distortion etc. of the logotype pattern. These estimates are then applied to the video image data from the other video signal source in order to make the video image data of the other video signal source appear in the composite video image in a way corresponding to the appearance of the logotype pattern.

This system is very complex to implement and requires a lot of processing in order to detect the arbitrary logotype pattern and to estimate the orientation, scale, perspective distortion etc.

SUMMARY OF THE INVENTION

It is an object of the present invention to present means for enabling simple and qualitative merging of two video signals into one video signal.

In particular, according to first aspect of the invention, the object is accomplished by means of a method for combining a first video signal with a second video signal, wherein at least the first video signal represents a sequence of video images. The method comprises the act of replacing image data in the second video signal with corresponding, in respect of a position within an image, image data from the first video signal when said image data in the second video signal includes a predefined repetitive pattern.

According to another aspect of the invention, the object of the invention is accomplished by means of a method for combining a first video signal and a second video signal into a third video signal, wherein each video signal represent a video image and wherein at least the first and third video signals represent a sequence of video images. The method comprises the acts of:

receiving said first video signal from a first source, receiving said second video signal from a second source, detecting whether image data in a predetermined number of pixels of said second video signal correspond to image data in pixels of a predefined repetitive pattern, and if the image data in the predetermined number of pixels do not correspond to image data in the pixels of the predefined repetitive pattern, then outputting a portion of said second video signal that corresponds to said predetermined number of pixels, or if the image data in the predetermined number of pixels do correspond to image data in the pixels of the predefined repetitive pattern, then outputting a portion of said first video signal that corresponds, in respect of position within an image, to said predetermined number of pixels.

According to yet another aspect of the invention, the object is accomplished by means of an apparatus for combining a first video signal with a second video signal, wherein said video signals represent video images and wherein at least the first video signal represents a sequence of video images, said apparatus comprising:

i) a first input for input of the first video signal, ii) a second input for input of the second video signal, iii) an output for output of a third video signal, iv) a keying-pattern detector connected to said second input for detecting a predefined repetitive pattern, wherein said keying-pattern detector comprises:

a means for receiving and/or storing a representation of the predefined repetitive pattern, and an output that is arranged to provide a signal indicating whether said predefined repetitive pattern is detected or not, and v) a video switch connected to said first input, said second input, said output and said output of the keying-pattern detector for continuously selecting a video signal from one of the first and second input to be represented in a third video signal, said selection being controlled by a signal from the output of the keying-pattern detector.

According to a further aspect of the invention, the object is accomplished by means of a video signal, wherein each pixel of a video image of said video signal is represented by a luminance value and two chrominance values. The video signal comprises:

a digitally generated background, in which the luminance values of the pixels are defining a predefined repetitive pattern, and a digitally generated video graphic foreground.

By using a predefined repetitive pattern to define the area of a video image that is to be replaced, all available colour levels and/or luminance levels, in the processed video images, may be allowed in any of the video images of the two video signals that are to be combined. The risk of getting any strange combination distortions in the resulting video image of the resulting video signal because the keying-colour being present in areas not to be combined is also reduced by the use of the predefined repetitive pattern, without the need of limiting the number of colour levels and/or the number of luminance levels.

Further, the process or means for determining whether to replace a portion of the second video signal with the first video signal or not, or whether a portion of the second or the first video signal are to be included in the resulting combined video signal, may easily be implemented, because only a portion of the pattern that are to be replaced has to be recognised at a time. Thus, the disadvantages of a colour-keying system may be overcome by using means that is not as sophisticated and complex as the means that has to be used in order to provide a system according to U.S. Pat. No. 5,566,251.

In the context of this invention a video signal is defined as a signal carrying image data representing at least one video image.

According to one embodiment of the invention the predefined repetitive pattern, which indicates that a portion in the video image of the second video signal is to be represented by the corresponding portion of the first video signal, is formed by consecutively arranged identical sub-patterns including a predetermined number of pixels. Accordingly, the act of detecting the predefined repetitive pattern in the second video signal is performed by reading a predetermined number of pixels from the second video signal and by comparing said read predetermined number of pixels with a keying-pattern including at least one sub-pattern.

By using a predefined repetitive pattern that is formed by said identical sub-patterns, which sub-patterns are defined at a pixel level, for identifying the portion or portions of a video signal to replace, the act of or the means for combining the video images of the two video signals may be made simple and precise. Further, the complexity of the system for detecting the predefined repetitive pattern may be down-scaled to a system that detects and replace one sub-pattern at a time instead of searching for an object occupying a rather large portion of the video image or, even worse, searching for said object in every consecutive video image in a sequence of video images. However, the system may also be designed to recognise a plurality of sub-patterns at a time and still present the above mentioned advantages.

Additionally, the system according to this embodiment may result in a rather fast combination procedure, which may be advantageous in real time applications, because of the possibility of performing the detection and replacement of the predefined repetitive pattern without having to store essentially an entire image in order to analyse the data of the image.

Further, if the second video image is generated by means of a video graphics generator, a precise version, on a pixel level, of the predefined repetitive pattern may easily be provided in the second video image. Thus, making it easy to detect the predefined repetitive pattern, because there is no need for the means detecting said pattern to consider any other representation than an exact replica of said pattern. Accordingly, values of pixels may be directly tested against the values of pixels in a keying-pattern.

According to another embodiment the predefined repetitive pattern is provided in data of the second video signal representing the luminance of the video image, e.g. if the data defining a pixel of the video image includes a luminance value and two colour values, the predefined repetitive pattern is provided in the luminance values of the pixels forming the video image.

By providing the predefined repetitive pattern in the luminance values of the video image and by detecting the same during the process of combining the two video signals the risk of getting strange combination distortions in the video image of the resulting video signal may be reduced even further.

Further, when combining chroma sub-sampled video images using some prior art methods/systems the resulting video image may show strange colour effects. These effects results from the fact that some pixels in a chroma sub-sampled image only carries data relating to luminance. This problem may be solved by providing and detecting the predefined repetitive pattern in the luminance values of the pixels representing the video image of the video signal.

Additionally, by implementing this embodiment of the invention the complexity of the system or process of combining two video signals may be reduced still more. This may be achieved by implementing the system or process to provide means only for detecting the predefined repetitive pattern in the luminance value of the pixels of the video image.

A further scope of applicability of the present invention will become apparent from the detailed description given below. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other features and advantages of the present invention will become apparent from the following detailed description of a presently preferred embodiment, with reference to the accompanying drawings, in which FIGS. 5a-d illustrates examples of sub-patterns that may be used in a predefined repetitive pattern according to the invention.

FIGS. 6a-c illustrates examples of different sub sampling strategies,

FIG. 7 illustrates the form and data of a sub-pattern in accordance with one embodiment of the invention, FIG. 10 shows a schematic block diagram of a video combining device and a flowchart of a process of a keying-pattern detector in accordance with one embodiment of the invention.

DETAILED DESCRIPTION OF PREFERRED EMBODIMENTS

Figure 1:
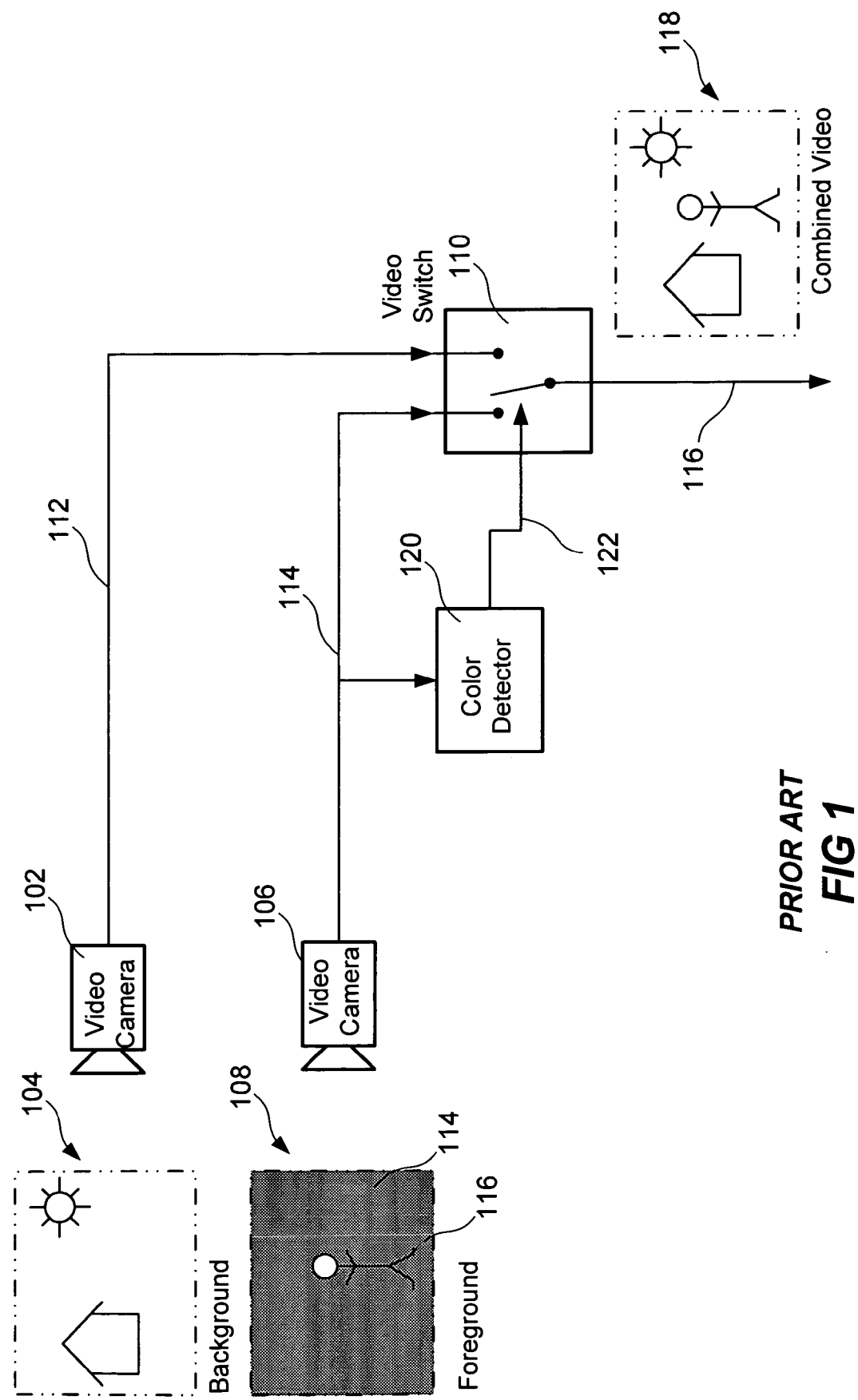
FIG. 1 illustrates a prior art system for combining video signals using colour keying, FIG. 2 schematically illustrates an embodiment of a system for combining video signals using the invention.

In FIG. 1, an example of a prior art colour-keying system for combining two video signals is shown. The system includes a video camera 102 for recording of a background 104, a video camera 106 for recording of a foreground 108, a video switch 110 for switching between a background video signal 112 and a foreground video 114 signal generating a single video signal 116 representing a combination 118 of the foreground 108 and the background 104, and a colour detector 120 controlling the video switch 110.

A foreground setting 108 is arranged. The background in the setting 108, i.e. the areas 114 of the setting that are to be replaced in the final video sequence, are painted or in any other way provided with a single colour. Normally the areas that are to be replaced are coloured blue. Then the objects or persons 116 that are to be visible in the final video sequence are recorded in front of the single coloured background by means of the camera 106. Then the video signal 114 representing the recorded foreground video sequence is sent to the video switch 110.

Additionally, a background setting 104 is arranged or selected. The background setting 104 is recorded by means of camera 102. Then the video signal 112 representing the recorded background video sequence is sent to the video switch 110.

The foreground video signal 114 is also provided to the colour detector 120. The colour detector 120 is arranged to detect, in the foreground video signal 114, the presence of areas of the recorded foreground video sequence that have said single colour. When said single colour is detected, the colour detector sends a signal 122 to the video switch 110 telling the video switch to forward image information from the background video signal 112. When said single colour is not detected, the colour detector sends a signal 122 to the video switch telling the video switch to forward image information from the foreground video signal 114. Thus, the resulting video signal 116 is formed by a combination of the foreground video signal 114 and the background video signal 112 and results in a combined video sequence 118. The resulting video sequence may then be recorded on tape, broadcasted live, stored on a server, etc.

This system and method for combining video sequences are commonly used in television broadcasts and in motion pictures in order to position a reporter or a character in an environment that is not available for practical or technical reasons.

The above mentioned system and the constructional details of such a system are known to a person skilled in the art.

Figure 2:
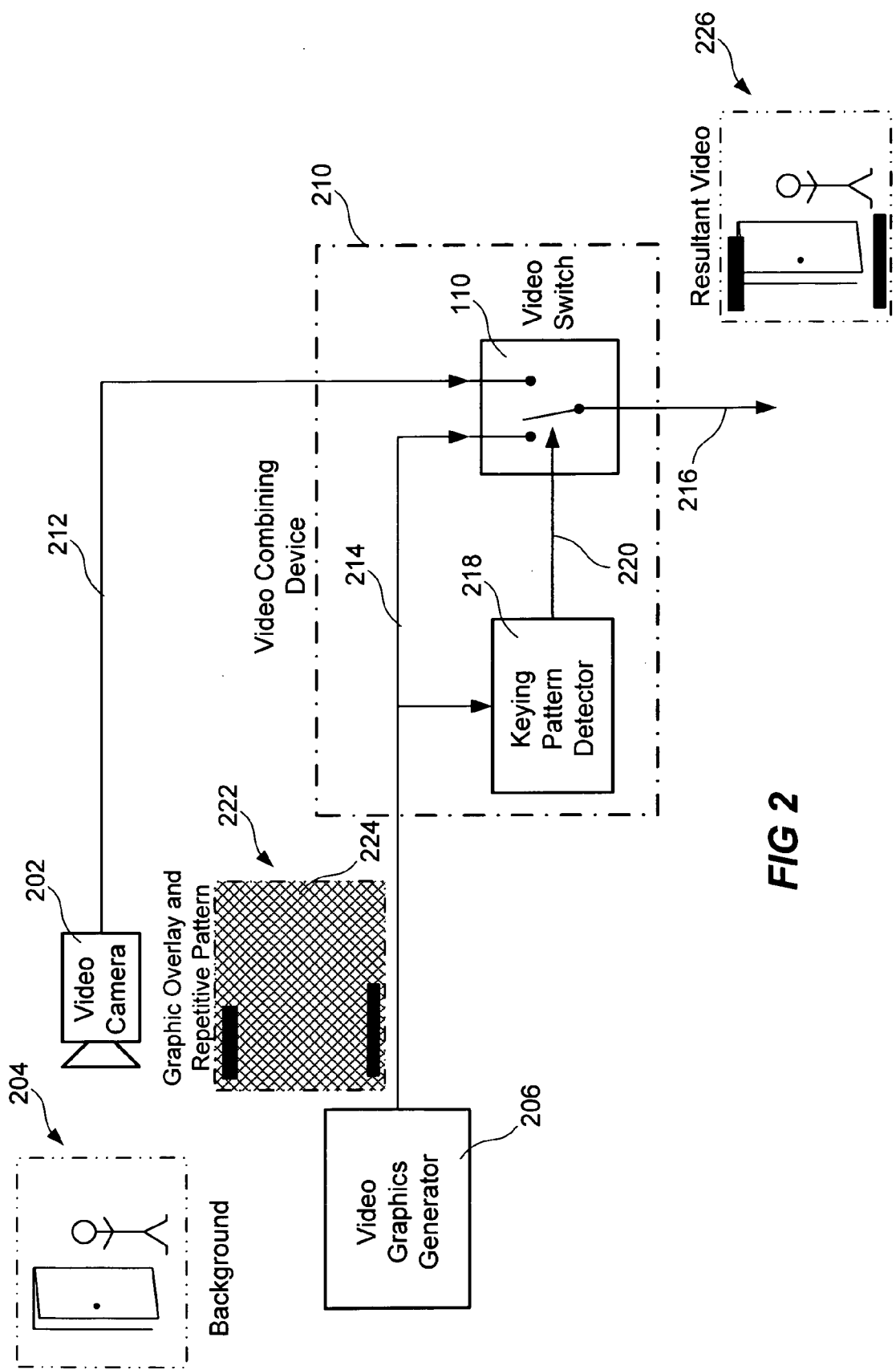

In FIG. 2, a system according to the invention is shown. The system comprises a camera 202 for recording a video sequence of a background 204, an event 204, or occurrences at a specific site 204. The camera 202 may be a studio camera, a handheld video camera, a surveillance camera, a web camera, etc. Further, the system comprises a video graphics generator 206 generating a digital graphic overlay 222 to be positioned on top of the video sequence recorded by the camera 202, a video combining device 210. The video combining device 210 comprises a video switch 110 for switching between a camera video signal 212 and a graphics video signal 214 in order to generate a combined video signal 216, and a keying-pattern detector 218 controlling the video switch 110 by sending a control signal 220 to the switch. The camera video signal 212 and the graphics video signal 214 are preferably digital video signals, e.g. video signals according to the standards of CCIR (Consultative Committee for International Radio), ATSC (Advanced Television Systems Committee), or any other available digital video fromat.

The video graphics generator 206 is arranged to generate video graphics 222 that are to be positioned on top of the video sequence recorded by the camera 202. For example, the video graphics 222 may be a date, a time, a logotype, a name, information regarding settings of the camera or other equipment, other information, animated objects or persons/characters, etc, or any combination thereof The background of the video graphics, i.e. the areas of the video graphics that are to be replaced with the video sequence of the camera 202, are indicated by a predefined repetitive pattern 224 in the video graphics 222.

The pattern may be formed by at least one sub-pattern which is defined at a pixel level and which is consecutively repeated for forming said predefined repetitive pattern 224. The video graphics 224 may be a sequence of images, i.e. animated. For example may information be continuously updated in consecutive images or may a logotype, object or person/character be animated. According to another embodiment the video graphics may be a still image.

The video graphics generator 206 convert the video graphics 222 to said graphics video signal 214 and provide the signal 214 to the video switch 110 and the keying-pattern detector 218 of the video combining device 210.

Said video graphics generator 206 may be an embedded processor system arranged to automatically generate the video graphics 222 from received information, such as time values or other data, and/or text strings. It may also be a laptop computer, a desktop computer, or any other device capable of generating said video graphics having a predefined repetitive pattern 224, see also the paragraphs below presenting more detailed information regarding possible video graphics generators.

The camera 202 is arranged to provide said camera video signal 212, representing a sequence of image frames, to the video switch 110.

The keying-pattern detector 218 receives the graphics video signal 214 and compare the contents of the graphics video signal 214 with a representation of a reference pattern, which may correspond to at least one sub-pattern of the predefined repetitive pattern 224. If the contents of the graphics video signal corresponds to the reference pattern, the keying-pattern detector 218 sets the control signal 220 to a state that makes the video switch 110 forward the camera video signal 212. If the contents of the graphics video signal does not correspond to the reference pattern, the keying-pattern detector 218 sets the control signal 220 to a state that make the video switch 110 forward the graphic video signal 214. The reference pattern is also called keying-pattern because it represent the pattern that is arranged to key the camera video signal 212 into the resulting video signal 216.

The video switch 110 may operate in the same way that a prior art video switch, passing through image data from one of two video signals 212, 214, depending on the value/state of a control signal 220. By making the keying-pattern detector 218 control the switch and by providing a predefined repetitive pattern in the video graphics, the combined video signal 216 may be made to represent a sequence of images 226 in which each image includes a portion of each image of the image sequence recorded by means of the camera 202 and a portion of each image of the image sequence generated by means of the video graphics generator 206.

The combined video signal 216 may then be forwarded to a device or an application having network server functionality in order to prepare the video signal for transfer to viewing devices via a network, e.g. the network may be a computer network or a surveillance network, to an internal display of a device comprising the video combining device 210, to a recording equipment for storing the image sequence of the video signal, etc. The resulting video sequence may then be recorded on tape, broadcasted live, stored on a server, etc.

Figure 3:
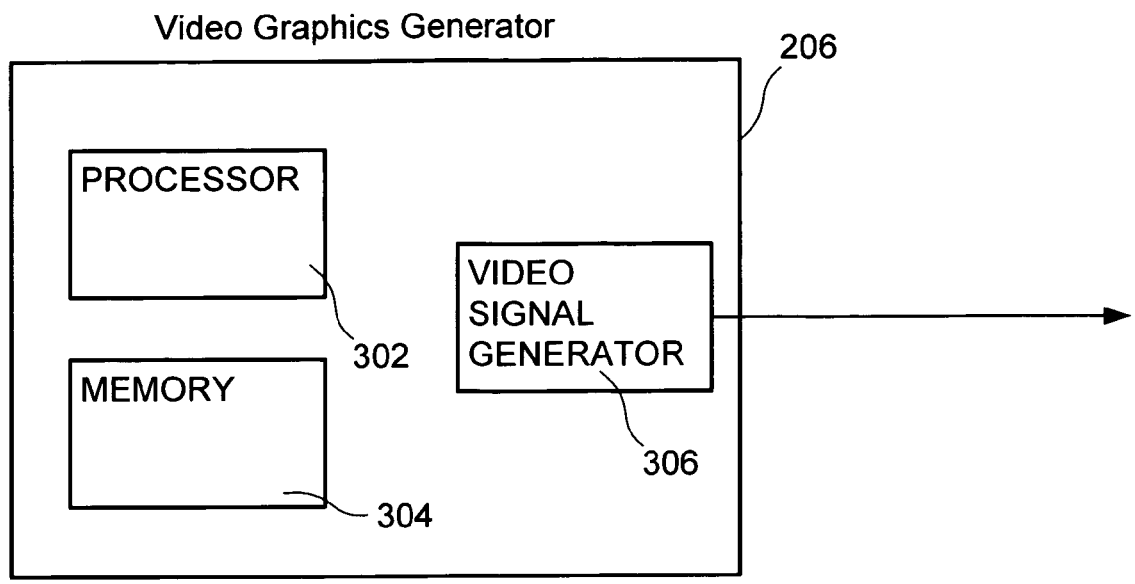
FIG. 3 shows a schematic block diagram of a video graphics generator in accordance with an embodiment of the invention.

In FIG. 3, a schematic view of a video graphics generator 206 according to one embodiment is shown. The video graphics generator may be an embedded processor system, a laptop computer, a desktop computer, or any other means of generating video graphics having a predefined repetitive pattern. The video graphic generator may even be formed by a counter addressing image information in a memory for outputting video graphics stored in said memory. However, according to one embodiment the video graphics generator 206 may comprise a processor 302, a memory 304, and a video signal generator 306. The processor 302 is arranged to process program code and video graphics information stored in the memory 304 in order to generate the predefined repetitive pattern and the graphics overlay that is to be sent to the video switch. The processor may be a processor dedicated for the graphic generator or a processor of a system in which the graphic generator is embedded. The video signal generator 306 provide image frames of the video graphic that are of the same format as the format utilised by the camera and the keying-pattern detector. Moreover, a signal carrying the image data of the video graphics is generated and outputted.

In one embodiment of the video graphics generator 206 the video graphics generator 206 may generate a sequence of video images even if the video image in reality is a still image. Graphics generators capable of generating video graphics in a standard digital video format and generating a signal carrying the image data of the video graphics are well known to persons skilled in the art.

Figure 4:
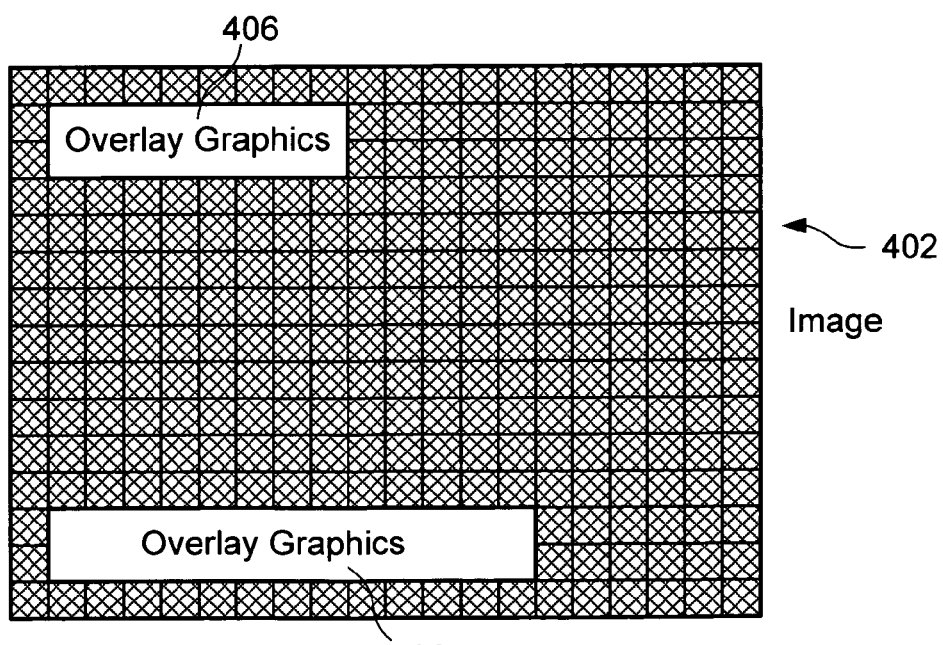
FIG. 4 shows a schematic representation of an image which may be used in order to achieve the combined video signal according to one embodiment of the invention.

According to one embodiment the predefined repetitive pattern may be formed by image data of at least one non repetitive sub-pattern, this is illustrated in FIG. 4. An image 402 of the image sequence that is generated by the video graphics generator may include a plurality of identical predefined sub-patterns 404 forming the predefined repetitive pattern representing the areas of the image 402 that are to be replaced. The overlay graphics 406 that are to be visible in a resulting combination may then be positioned on top of the repetitive pattern.

The sub-pattern may include as many pixels as one find appropriate for a specific application. The sub-pattern may be defined as a specific variation in chrominance between the pixels of the sub-pattern, as a specific variation in luminance, or as a combination of the two previously mentioned variants. The overlay graphics 406 may, as previously mentioned be a date, a time, a logotype, a name, information regarding settings of the camera or other equipment, other information, animated objects or persons/characters, etc, or any combination thereof In FIGS. 5a-d some examples of sub-patterns are shown. Each square in the figures represent a pixel and the different fill patterns of the squares indicates different values in at least one of the parameters defining the pixels. For example, in FIG. 5a the parameters of the first pixel 422 may be, in RGB notation, 0,0,0 and the parameters of the second pixel 424 may be 255,255,255, or the parameters of the first pixel 422 may be ?,0,? and the parameters of the second pixel may be ?,255,?, the question mark indicates that the value of the parameter does not matter. If the parameters of each pixel is defined by luminance-chrominance values, the parameters defining the pixels may for example be, in Y, Cb, Cr, notation, 255,?,? for the first pixel 422 and 0,?,? for the second pixel, the question mark indicates that the value of the parameter does not matter, or the parameters may for example be 0,0,0 for the first pixel 422 and 255,255,255 for the second pixel 424. Any other combination of parameter values may be possible as long as the parameter combination for the first pixel 422 is not identical to the parameter combination of the second pixel 424. As showed in FIG. 5d, it may also be possible to give two pixels within the same sub-pattern identical values as long as the sub-pattern may be distinguished from patterns not being a sub-pattern.

According to one embodiment the digital video sent from the camera 202 and from the video graphics generator 206 in FIG. 2 is defined by luminance-chrominance values, Y Cb Cr, and is chroma sub-sampled, i.e. the colour information in each picture is sampled at lower spatial resolution than the luminance. The signal may for example be 4:2:2 chroma sub-sampled, 4:1:1 chroma sub-sampled, 4:2:0 chroma sub-sampled, or any other type of chroma sub-sampling.

In FIGS. 6a-d, portions of chroma sub-sampled video images are illustrated schematically. Each square in the FIGS. 6a-d correspond to a pixel of the video image. In the chroma sub-sampled video images a specific luminance value Y1-Y4 is defined for each pixel. However, a specific chrominance value, which is defined by the values of Cb and Cr, is not defined for each pixel.

In 4:2:2 chroma sub-sampled video images, see FIG. 6a, one specific Cb value is defined for two horizontally consecutive pixels and one specific Cr value is defined for two horizontally consecutive pixels. Thus, the chrominance of two such consecutive pixels, e.g. the ones framed by a thicker line, are identical, i.e. the colour of the two pixels defined by the same chrominance data. Accordingly, a 4:2:2 chroma sub-sampled video image essentially contains half the colour information in respect of a video image wherein the colour of each specific pixel is defined.

In 4:1:1 chroma sub-sampled images, see FIG. 6b, the chrominance of four horizontally consecutive pixels are defined by the same chrominance data, e.g. the ones framed by a thicker line. Thus, such video image essentially contains a fourth of the colour information in respect of a video image wherein the colour of each specific pixel is defined.

In 4:2:0 chroma sub-sampled video images, see FIG. 6c, the chrominance of four pixels arranged in a square, e.g. the ones framed by a thicker line, are defined by the same chrominance data. Thus, such video image essentially contains a fourth of the colour information in respect of a video image wherein the colour of each specific pixel is defined.

As seen in FIGS. 6a-6c a specific luminance value is, however, defined for each pixel. The theory behind these sub-sampling methods states that the human eye is more sensitive to variations in luminance than in chrominance.

According to one embodiment of the invention the video images of the video image sequence are 4:2:2 chroma sub-sampled and the sub-pattern is defined by means of two consecutive pixels, e.g. the pixels including Y1 and Y2 in FIG. 6a. In order to define a pattern the luminance value of the first pixel Y1 is defined as a specific value Yα and the luminance value of the second pixel is defined as Yβ, see FIG. 7. The values of the chrominance Cb, Cr in each of the two pixels of the sub-pattern may be any value, because the sub-pattern is only defined by the luminance values Yα and Yβ of the two pixels of the sub-pattern.

In embodiments utilising the 4:1:1 chroma sub-sampling the sub-pattern of the predefined repetitive pattern may be defined in a similar way, e.g. by forming the sub-pattern in the luminance values Y1-Y4, shown in FIG. 6b. Accordingly, the two chrominance values Cb, Cr defining the colour of the four pixels may be set to any value in such embodiments. In a similar way may the sub pattern of an embodiment utilising the 4:2:0 chroma sub-sampling be defined by the luminance values Y1-Y4 of four pixels arranged in a square. For example, the four pixels may be the two first pixels in the first row of FIG. 6c and the two first pixels in the second row of FIG. 6c.

As mentioned above, the keying-pattern detector of one embodiment of the invention compares data from pixels sent from the graphics generator with data representing a portion of a predefined repetitive pattern. For example, the data from the pixels sent from the graphics generator may be compared with data of a predefined sub-pattern of the predefined repetitive pattern. Further, the data from the pixels that are compared to the data of the sub-pattern may, for instance, be one or a plurality of the RGB parameters defining a pixel or one of or both the luminance and the chrominance YcbCr parameters, depending on the coding of the pixels. The comparison may be performed in a cyclic manner and in each cycle the comparison may be performed for a number of pixels that correspond to the number of pixels represented in the sub-pattern. According to one embodiment the comparison is performed for consecutive blocks of said number of pixels, i.e. a comparison for a pixel is only performed once.

Figure 8:
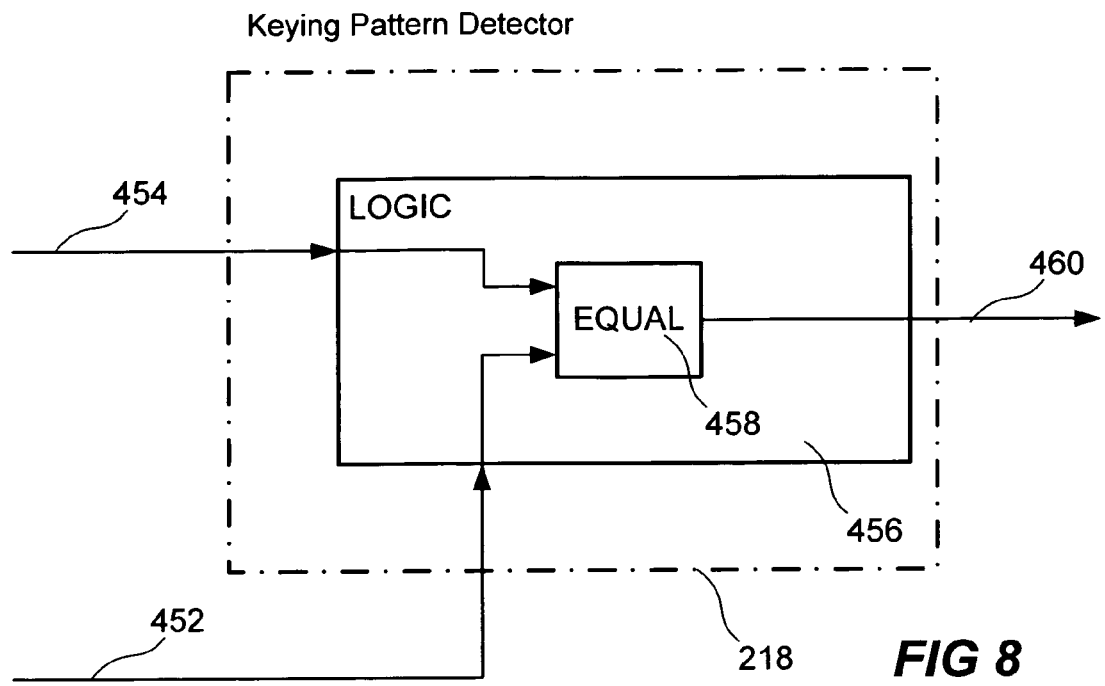
FIG. 8 shows a schematic block diagram of a keying-pattern detector in accordance with one embodiment of the invention.

In FIG. 8 one embodiment of a keying-pattern detector 218 of the invention is shown. The data relating to the pixels sent from the graphics generator are received at the video graphics input 452 and data relating to the keying-pattern are present at the sub-pattern input 454. The data from the inputs 452, 454, respectively, may be compared by means of logic circuitry 456 in order to determine whether the data from the video graphics generator are identical to the data of the keying-pattern. The comparison may be performed by means of logic circuitry implementing an EQUAL-function 458, see table below. The EQUAL-function may then provide the control signal via output 460.

Figure 9:
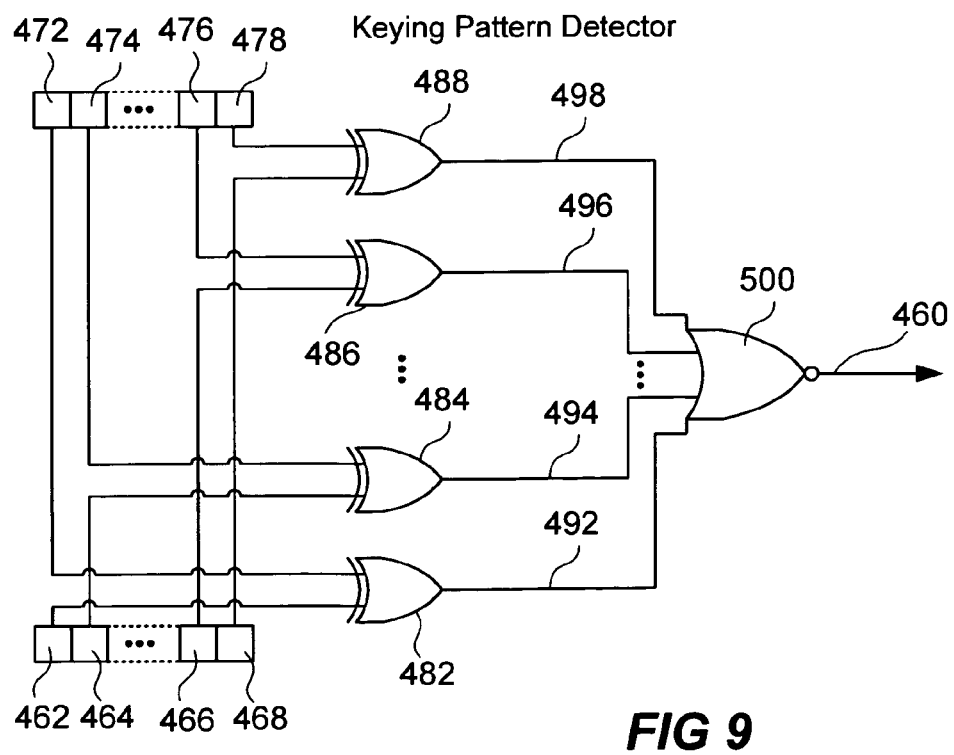
FIG. 9 shows a schematic diagram of the logic of a specific embodiment of the keying-pattern detector according to FIG. 8.

There are many ways of implementing the EQUAL-function which are known to a person skilled in the art. Therefore, only one embodiment of such an implementation is described below, see FIG. 9. Each bit 462-468 of the data from the video graphics generator that are to be compared with the keying-pattern is tested against each corresponding bit 472-478 of the keying-pattern by means of an XOR-gate 482-488 (exclusive or gate). The number of bits in the keying-pattern and, thus, the number of bits in the data from the video graphics generator that are to be tested against the keying-pattern depends on the number of pixels from the graphics generator that are to be tested in each detection cycle, the number of parameters to test for each pixel, and the number of bits in each parameter to test.

For example, in a two pixel keying-pattern, i.e. two pixels at a time is compared to the keying-pattern, that only relates two the luminance of a 4:2:2 chroma sub-sampled video image and in which video image, and keying-pattern, each luminance value is represented by eight bits, the number of bits in the keying-pattern and the video image, respectively, to test each time is sixteen, i.e. the keying-pattern consists Truth table for the EQUAL function 458

| Video graphics input 452 | Sub-pattern input 454 | control signal output 460 |
|---|---|---|
| 0 | 0 | 1 |
| 0 | 1 | 0 |
| 1 | 0 | 0 |
| 1 | 1 | 1 | of sixteen bits and the data to test consists of sixteen bits.

When each bit of the data of the video image has been tested against each bit of the keying-pattern in the XOR-gates 482-488, the resulting signal 492-498 of each XOR-gate 482-488 may be tested against all other resulting signals 492-498 of the other XOR-gates 482-488 in a final NOR-operation, which is illustrated by the NOR-gate 500. Accordingly, if the data 452 from the video graphics generator corresponds to the data 454 of the keying-pattern, all the resulting signals 492-498 will all correspond to a state "0" and, thus, the final NOR-operation 500 will result in a control signal 460 corresponding to the state "1". If one or a plurality of bits of the data 452 from the video graphics generator do not correspond to the corresponding bits of the keying-pattern, one or a plurality of the resulting signals 492-498 will correspond to a state "1" and, thus, the NOR-operation 500 will result in a control signal 460 corresponding to the state "0". This resulting signal may then be provided to the switch for controlling whether the portion of the signal from the video graphics generator that includes the data that was tested are to be forwarded by the switch or not. In the example above a control signal corresponding to the state "1" makes the switch forward the signal from the graphics generator whereas a control signal corresponding to state "0" makes the switch forward the signal from the camera.

In FIG. 8 the keying-pattern is provided to the keying-pattern detector by means of a signal line or a data bus external to the keying-pattern detector 218. In such an implementation the keying-pattern may be stored in a memory of the device including the keying-pattern detector 218. However, the keying-pattern may also be stored or hard coded into the keying-pattern detector 218.

In FIG. 10 an embodiment of the invention is described. In the embodiment the keying-pattern detector 218 and the video switch 110 is arranged in a video combining device 210. Further, the images of the image sequence from the camera and the images from the graphics generator are 4:2:2 chroma sub-sampled. Thus, two pixels of said images are represented by means of the parameters Y1, which represents the luminance value of the first pixel of the two pixels, Y2, which represents the luminance value of the second pixel of the two pixels, Cb and Cr, which together define the colour of said two pixels. In the text hereinafter, such two pixels are related to as a pair of pixels.

The camera video signal 212 is received at a first input 512 of the video combining device 210 and the graphics video signal 214 is received at a second input 514 of the video combining device 210. The image sequences of the two video signals may be synchronised in respect of the image frames and pixels of said image sequences, i.e. a pair of pixels of the camera video signal 212 and a corresponding, in respect of position within an image, pair of pixels of the graphics video signal 214 are in position to be forwarded by the video switch 110 at essentially the same time. If the video signals are not synchronised when received at the inputs 512, 514, then the video combining device may be arranged to synchronise the signals.

The keying-pattern detector receives luminance data corresponding to the luminance Y1, Y2 of one pair of pixels at a time, step 520. The bits of the luminance data are compared with the bits of a keying-pattern that is inputted to the keying-pattern detector 218 via input 516 or which may be present in the detector 218, step 522. The keying-pattern correspond to a sub-pattern of the predefined repetitive pattern. If the luminance data correspond to the keying-pattern then the control signal 220 is set to a state corresponding to a state "1", step 524. If the luminance data do not correspond to the keying-pattern then the control signal 220 is set to a state corresponding to the state "1", step 526. Then, the keying-pattern detector 218 starts a new cycle, step 528, by receiving the luminance data of the next pair of pixels.

The control signal 220 is received by the video switch 110. If the control signal indicates the state "1", the video switch 110 forwards the portion of the graphics video signal corresponding to the two pixels to which the luminance values Y1, Y2 tested by the keying-pattern detector belong, and if the control signal indicates the state "0", the video switch 110 forwards the portion of the camera video signal corresponding, in regard of position within an image, to said pair of pixels of the graphics video signal.

Accordingly, the images represented by the resulting video signal 216, outputted from the video switch 110, do not include any portions of the graphics video signal having luminance parameters Y1, Y2 that are identical to the keying-pattern, because the video switch 110 forwards the corresponding camera video signal when such portions are present.

What is claimed is:

1. An apparatus for combining a first video signal with a second video signal, wherein said video signals represent video images and wherein at least the first video signal represents a sequence of video images, said apparatus comprising:

i) a first input for input of the first video signal,
ii) a second input for input of the second video signal,
iii) an output for output of a third video signal,
iv) a keying-pattern detector connected to said second input for detecting a predefined repetitive pattern, wherein said keying-pattern detector comprises:
  a means for receiving and/or storing a representation of the predefined repetitive pattern, and
  an output that is arranged to provide a signal indicating whether said predefined repetitive pattern is detected or not, and
v) a video switch connected to said first input, said second input, said output and said output of the keying-pattern detector for continuously selecting a video signal from one of the first and second input to be represented in a third video signal, said selection being controlled by a signal from the output of the keying-pattern detector; and
wherein said predefined repetitive pattern includes consecutively arranged sub-patterns.

2. An apparatus for combining a first video signal with a second video signal, wherein said video signals represent video images and wherein at least the first video signal represents a sequence of video images, said apparatus comprising:

i) a first input for input of the first video signal,
ii) a second input for input of the second video signal,
iii) an output for output of a third video signal,
iv) a keying-pattern detector connected to said second input for detecting a predefined repetitive pattern, wherein said keying-pattern detector comprises:
  a means for receiving and/or storing a representation of the predefined repetitive pattern, and
  an output that is arranged to provide a signal indicating whether said predefined repetitive pattern is detected or not, and
v) a video switch connected to said first input, said second input, said output and said output of the keying-pattern detector for continuously selecting a video signal from one of the first and second input to be represented in a third video signal, said selection being controlled by a signal from the output of the keying-pattern detector; and
wherein said representation of the predefined repetitive pattern handled at the keying-pattern detector includes video image data of a predetermined number of pixels corresponding to the number of pixels of a sub-pattern of the predefined repetitive pattern.

3. The apparatus of claim 2, wherein said video image data comprise data representing the luminance of said predetermined number of pixels.

4. A method for combining a first video signal with a second video signal, wherein at least the first video signal represents a sequence of video images, and said method comprising the act of:
replacing image data in the second video signal with corresponding, in respect of a position within an image, image data from the first video signal when said image data in the second video signal includes a predefined repetitive pattern; and
wherein said predefined repetitive pattern is formed by consecutively arranged identical sub-patterns including a predetermined number of pixels, said method further comprising the act of:
detecting, before the act of replacing image data, the predefined repetitive pattern in the second video signal by comparing said predetermined number of pixels with a keying-pattern including at least one sub-pattern.

5. The method of claim 4, wherein the act of replacing image data in the second video signal further comprises the act of:
replacing image data in the second video signal with corresponding, in respect of a position within an image, image data from the first video signal when the luminance data in said image data of the second video signal represent a predefined repetitive pattern.

6. A method for combining a first video signal with a second video signal, wherein at least the first video signal represents a sequence of video images, and said method comprising the act of:
replacing image data in the second video signal with corresponding, in respect of a position within an image, image data from the first video signal when said image data in the second video signal includes a predefined repetitive pattern; and
wherein said method for combining includes combining chroma sub-sampled image data of said first video image with chroma sub-sampled image data of said second video signal; and
wherein said predefined repetitive pattern is formed by consecutively arranged identical sub-patterns including a predetermined number of pixels, said method further comprising the act of detecting, before the act of replacing, a sub-pattern in the image data of the second video signal by comparing the luminance data of a number of pixels sharing the same data for chrominance, in accordance with chroma sub-sampling method utilised, with a keying-pattern representing luminance data of the same number of pixels.

7. A method for combining a first video signal and a second video signal into a third video signal, wherein each video signal represent a video image and wherein at least the first and third video signals represents a sequence of video images, said method comprising the acts of:
receiving said first video signal from a first source,
receiving said second video signal from a second source,
detecting whether image data in a predetermined number of pixels of said second video signal corresponds to image data in pixels of a predefined repetitive pattern, and
if the image data in the predetermined number of pixels do not correspond to image data in the pixels of the predefined repetitive pattern, then outputting a portion of said second video signal that corresponds to said predetermined number of pixels, or
if the image data in the predetermined number of pixels do correspond to image data in the pixels of the predefined repetitive pattern, then outputting a portion of said first video signal that corresponds, in respect of position within an image, to said predetermined number of pixels; and
wherein said predefined repetitive pattern is formed by consecutively arranged identical sub-patterns including image data of a predetermined number of pixels, and said act of detecting includes the act of detecting the predefined repetitive pattern in the second video signal by comparing image data from said predetermined number of pixels with a keying-pattern including at least one sub-pattern.

8. The method of claim 7, wherein the act of detecting further comprises:
detecting whether a predefined repetitive pattern is present in the luminance values of said predefined number of pixels of the second picture or not.

* * * * *